(12) United States Patent
Kaleck

(10) Patent No.: US 10,966,373 B1
(45) Date of Patent: Apr. 6, 2021

(54) APPARATUS FOR AUTOMATIC STEM CUTTING FOR PLANT PROPAGATION

(71) Applicant: Robert Kaleck, Riverside, CA (US)

(72) Inventor: Robert Kaleck, Riverside, CA (US)

( * ) Notice: Subject to any disclaimer, the term of this patent is extended or adjusted under 35 U.S.C. 154(b) by 355 days.

(21) Appl. No.: 15/972,768

(22) Filed: May 7, 2018

Related U.S. Application Data

(60) Provisional application No. 62/504,270, filed on May 10, 2017.

(51) Int. Cl.
*A01G 3/00* (2006.01)
*A01G 7/00* (2006.01)

(52) U.S. Cl.
CPC ............... *A01G 3/00* (2013.01); *A01G 7/00* (2013.01)

(58) Field of Classification Search
CPC ....... A01G 3/00; A01G 3/02; A01G 2003/005
See application file for complete search history.

(56) References Cited

U.S. PATENT DOCUMENTS

| | | | |
|---|---|---|---|
| 2011/0046785 A1* | 2/2011 | Zeelen | A01G 3/00 700/259 |
| 2015/0082695 A1* | 3/2015 | Rodel | A01C 1/00 47/58.1 FV |
| 2018/0077866 A1* | 3/2018 | Perez | A01D 43/086 |

FOREIGN PATENT DOCUMENTS

WO  WO-2009100917 A1 * 8/2009 ............. A01F 29/09

* cited by examiner

*Primary Examiner* — Monica L Barlow
(74) *Attorney, Agent, or Firm* — Roy L Anderson

(57) ABSTRACT

An electro-mechanical device cuts plant stems at a desired angle after a stem is inserted into a stem shaft and a sensor triggers activation of a blade along a blade path at a desired angle. A portable device powered by batteries can be used with plantings where they are growing or a powered device can be used for line production or high volume work.

10 Claims, 4 Drawing Sheets

APPARATUS FOR AUTOMATIC STEM CUTTING FOR PLANT PROPAGATION

CROSS REFERENCE TO RELATED APPLICATIONS

This application is a non-provisional application which claims priority from U.S. Ser. No. 62/504,270, filed May 10, 2017, the disclosure of which is specifically incorporated herein by reference.

FIELD OF THE INVENTION

The present invention is in the field of propagating plants by stem cuttings.

BACKGROUND OF THE INVENTION

A common method of preparing plant matter for planting or cloning is to cut the stem at an angle using a razor blade. This method is time-consuming, makes it difficult to cut accurate and repeatable angles, and is a potential safety hazard to the worker. This activity is common to many agricultural operations.

SUMMARY OF THE INVENTION

The present invention is generally directed to an apparatus for automatically cutting stems for plant propagation through use of a power driven device having at least one hole into which a stem is inserted and then automatically cut at a desired angle after the stem is sensed, thus creating a repeatable cut at a desired blade angle and blade path.

Accordingly, it is an object of the present invention to provide an improved method of plant propagation via an automated plant cutter.

This and further objects and advantages will be apparent to those skilled in the art in connection with the drawings and the detailed description of the invention set forth below.

BRIEF DESCRIPTION OF THE DRAWINGS

FIG. 1 illustrates a preferred embodiment of the present invention while

DETAILED DESCRIPTION OF THE INVENTION

Figure 1:
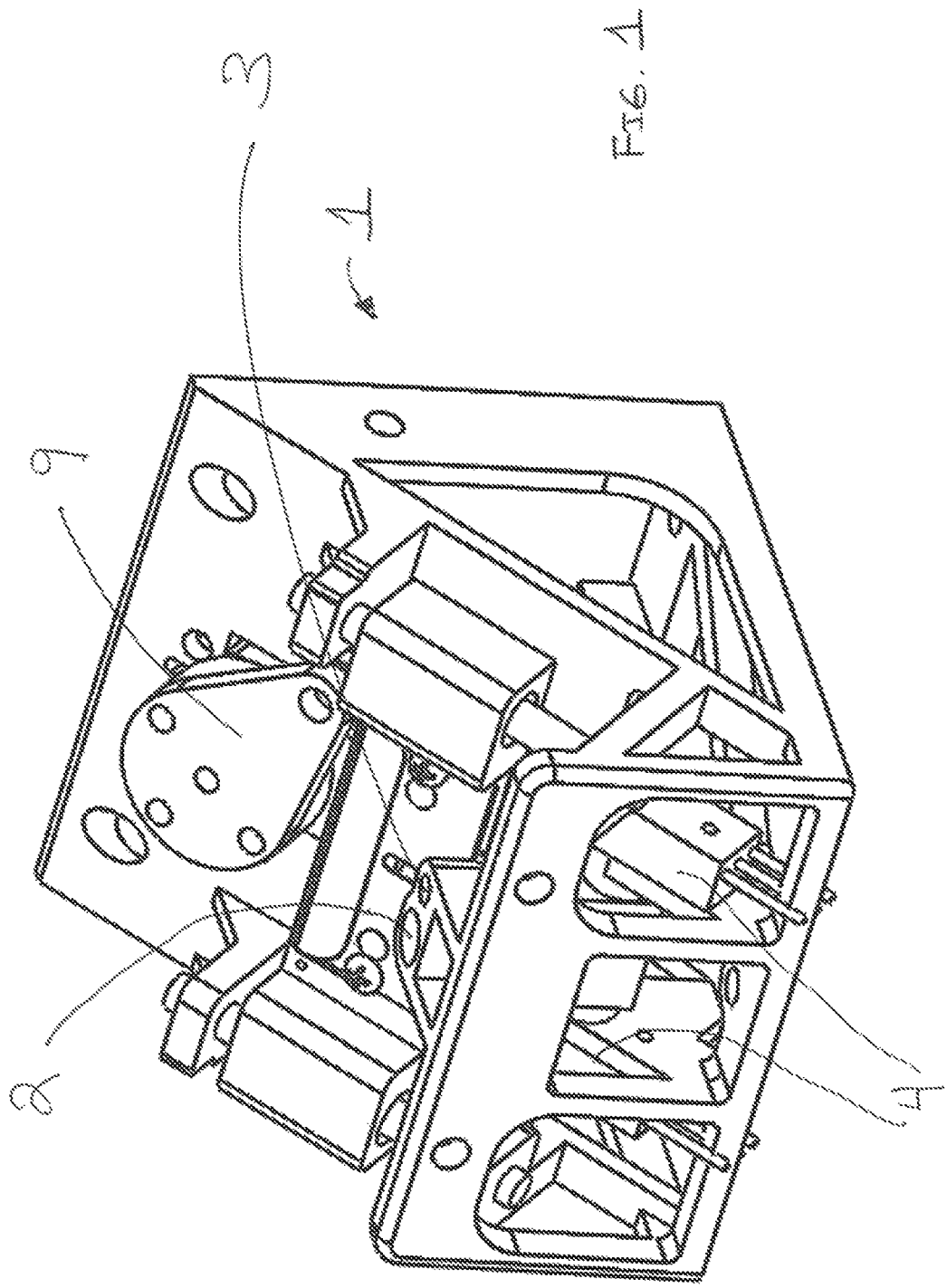

In accordance with the present invention, plant propagation can be automated by use of a device that holds and moves a blade or sharpened feature to cut a stem at a desired angle. This device can be automated using motors and/or sensors, or can be operated manually. The cut stem is cut at a desired blade angle and blade path. The action is repeatable, and through adjustment of the device, can be used to cut different angles and/or with different blade paths. The device speeds up a manual method and increases worker safety by containing the blade and cutting motion inside the device. This also reduces risk of contamination with other materials. The device's potential to also collect waste material is an efficiency improvement. The use of a motor or other actuator will reduce worker fatigue.

In an especially preferred embodiment, a piece of plant-matter is inserted stem-first into a hole in the device and the stem is sensed by a switch or other sensor. The stem may be held in the machine by a worker, or may be held in place by a feature in the device itself, an example of which is a boss attached to the blade support which applies pressure to the stem to prevent movement prior to and during the cutting operation. While the depth of stem insertion might be maintained by a fixed or adjustable stop inside the device, it is especially preferred that a worker using the device can determine that the insertion depth is correct, and this can be informed by use of an LED light to indicate that the stem is at the right depth, thereby removing the potential interference to a falling cut stem that might be created by a stop. To cut the stem, the blade support is rotated, either manually or by a motor, to slice the blade through the stem. For example, the blade can travel in a circular path, angled at 45 degrees, but other shapes of path (including but not limited to linear or parabolic) and blade angles are also possible. Other shapes and configurations of the blade support may also be used, and do not change the fundamental nature of the invention or its utility. After the cutting operation, the stem is released and withdrawn from the machine. The cut ends of the stems can fall out of the device, or can be collected inside the device for later disposal or processing. A removable bin is one method of achieving this function.

The present invention includes the following variations.

The actions of the device may be actuated by a motor or other electro-mechanical device, or may be operated by human/hand force.

The stem may be held in place by the worker, by an external device, or by an internal system, such as the boss already discussed. The boss or other retention device may directly contact the plant stem, or may be augmented by an additional layer or interface, such as, but not limited to, flexible tubing.

The stem sensor may be a mechanical, electrical, or optical device. The stem sensor may also be eliminated by use of an external, operator-controlled or machine/computer-controlled switch that initiates the cutting motion. A mechanical arrangement (e.g. a lever) or a non-mechanical arrangement (e.g. a timer) can also initiate the cutting motion.

The blade may be of a removable or a permanent nature. The blade may be integrated into the blade support.

The essential function of the machine can also be accomplished by holding the blade stationary and moving the plant matter or, alternatively, either moving both in concert or moving both sequentially.

The device may also be made in such a way that the cutting section can be attached to other collection or processing equipment, in a modular or semi-modular fashion.

The device, if operated with electricity, may be attached to external power, or may be battery operated, or may have the option to be powered by either.

The device can also be partially or fully automated by replacing some or all of the worker functions with further automation or robotics that work independently or in concert with the device described here.

Figure 2:
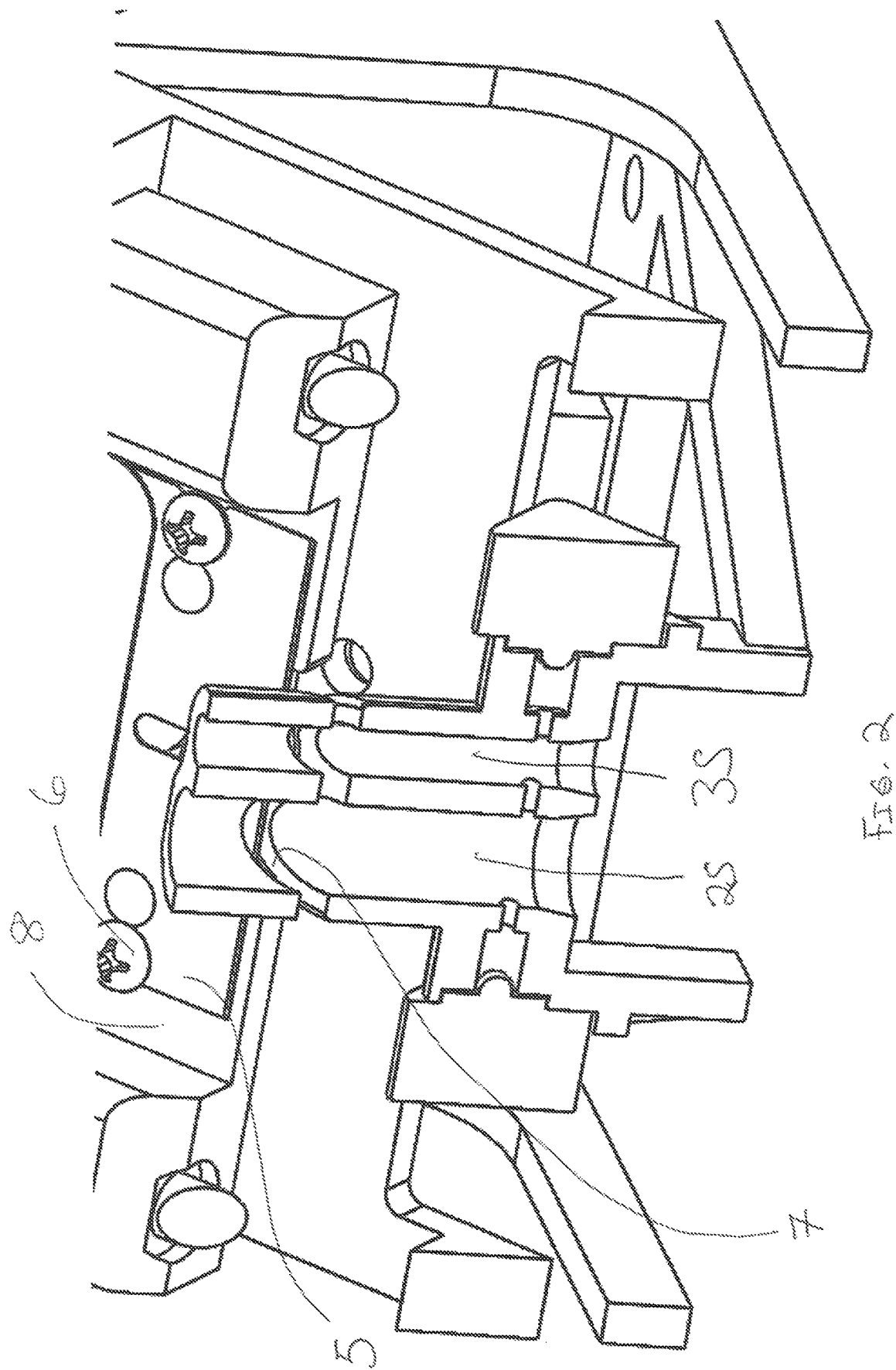
FIG. 2 is a blown up partial cutaway of a portion of FIG. 1.
Figure 3:
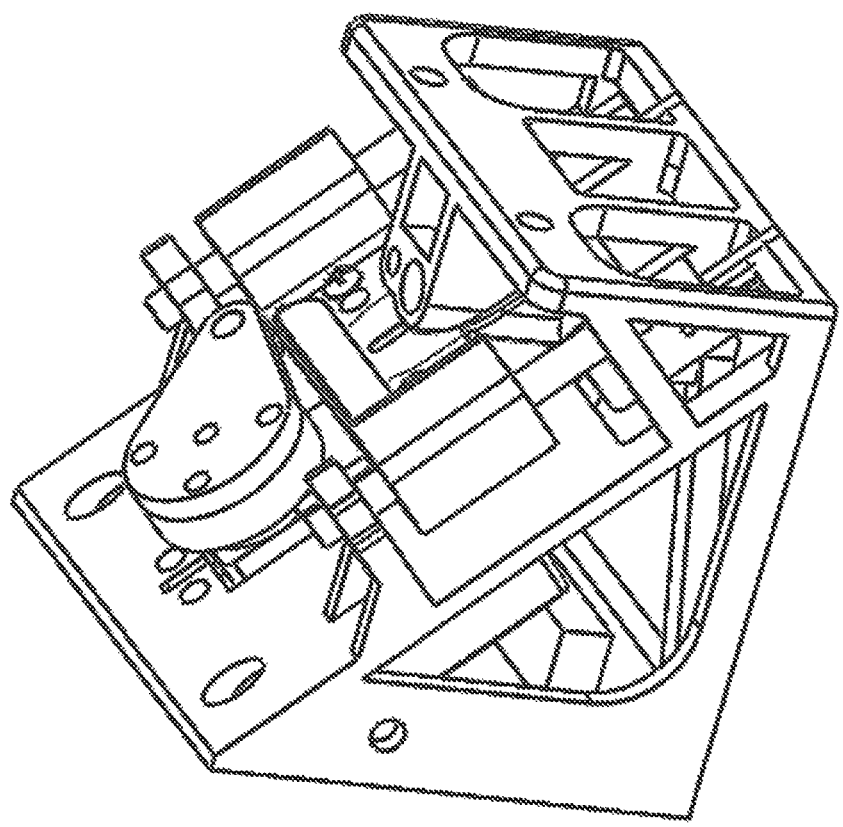
FIGS. 3 and 4 illustrate the embodiment illustrated in FIG. 1 rotated at different angles.
Figure 4:
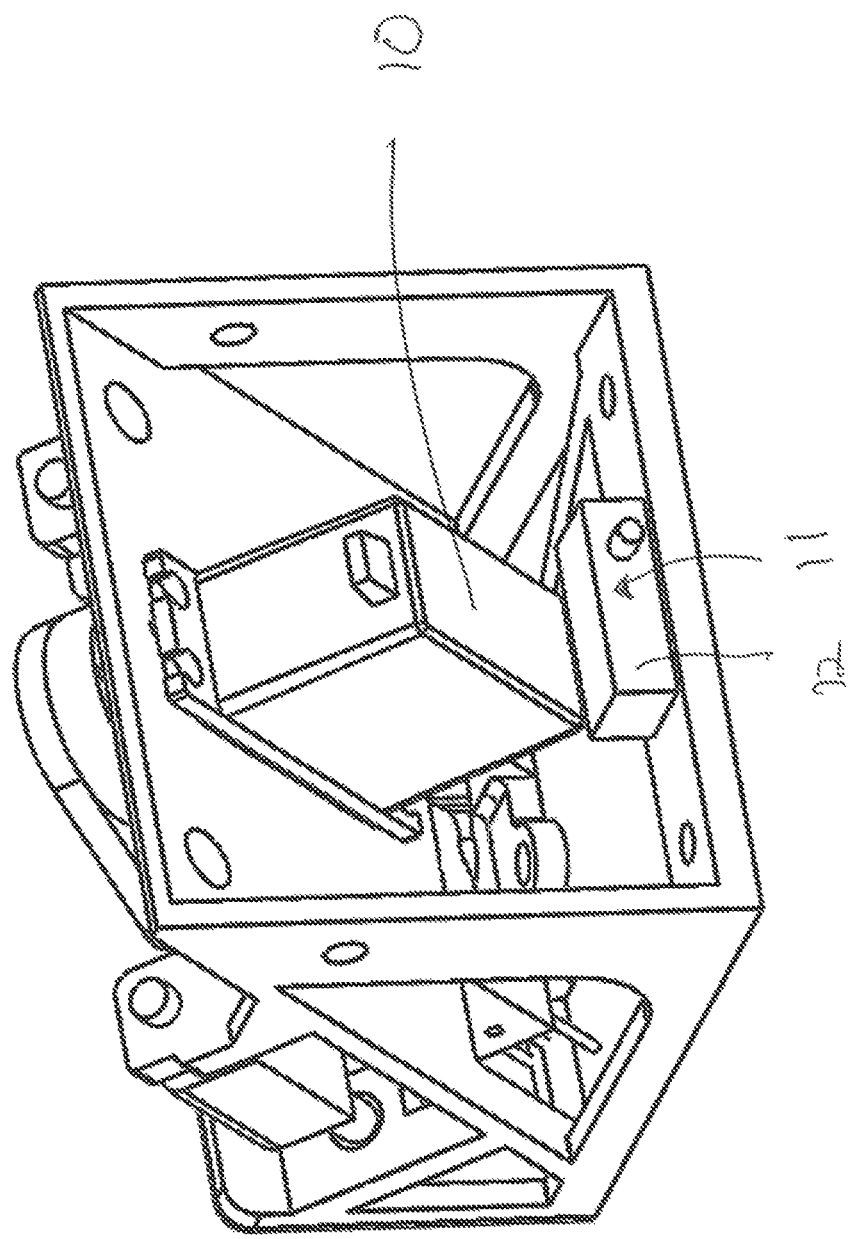

The invention will now be described in even greater detail by reference to an especially preferred embodiment illustrated in FIGS. 1-4. In the Figures and the following description, number designations indicate various features of the invention, with like number designations referring to like features throughout both the drawings and the description. Although the Figures are described in greater detail below, the following is a glossary of the elements identified in the Figures.

1 device for cutting stems
2 large diameter stem hole
2S large diameter stem shaft
3 small diameter stem hole
3S small diameter stem shaft
4 infrared ("IR") sensor
5 blade
6 means for securing blade
7 blade slot
8 blade sled
9 cam
10 servo motor
11 electronics
12 power supply Device 1 has large diameter stem hole 2 leading to large diameter stem shaft 2S adjacent small diameter stem hole 3 leading to small diameter stem shaft 3S, with both stem shafts being serviced by blade 5 which travels into and out of blade slot 7. Blade 5, in one embodiment, is a common straight razor blade, but it also can take on other forms, such as a custom blade or cutting device designed for specific use and application in device 1. Blade 5 is secured to blade sled 8 by an appropriate securing means 6, such as a fastener; it is especially preferred that blade 5 be readily removable from sled 8 so that it can be replaced after a certain period of use in which it may have become dull. Movement of blade sled 8 between a non-cutting and cutting position is controlled by servo motor 10 and electronics 11 which are powered by power supply 12. Power supply 12 may include a portable power source, such as a battery, or be adapted for use with a power supply or power outlet. Electronics 11 may be housed with power supply 12 and include requisite control components for device 1 to operate and function as designed, such as a controller, driver, memory and software. Device 1 may include an on/off switch (not shown) to conserve power when not in use. In the preferred embodiment illustrated in FIG. 1, an IR sensor is used to detect when a stem is inserted into either of shafts 2S and 3S, and then electronics 12 are used to cause blade sled 8 to move via use of cam 9 and servo motor 10.

It is not necessary for all devices to include more than one stem hole and shaft, but it has been found especially useful to have two or more stem holes and shafts. Having multiple diameters of stem holes and shafts allows for more repeatable sensing and may provide more precise holding of stems during the cutting operation, leading to more repeatable and uniform results.

It should be noted that FIGS. 1-4 illustrate the inner workings of a prototype of device 1, and do not include a body or case which would protect such components, and modifications can be made to the prototype when finalizing a production design embodying the inventive concepts described herein.

Although the foregoing detailed description is illustrative of preferred embodiments of the present invention, it is to be understood that additional embodiments thereof will be obvious to those skilled in the art. Further modifications are also possible in alternative embodiments without departing from the inventive concept. For example, a blade or cutting device might be replaced by a laser.

Accordingly, it will be readily apparent to those skilled in the art that still further changes and modifications in the actual concepts described herein can readily be made without departing from the spirit and scope of the disclosed inventions.

What is claimed is:

1. A plant cutter, comprising:
    a housing configured with a stem shaft with a stem opening configured to receive a plant stem;
    a sensor for sensing the plant stem within the stem shaft;
    a cutting device which is configured to cut the plant stem at a desired angle to create a cut stem and a cut piece of plant matter during a cutting operation; and
    an actuation mechanism for actuating the cutting operation;
    wherein the cutting device is and configured so that the cutting device will not cut an object outside of the housing during the cutting operation.

2. The plant cutter of claim 1, further comprising a stop for preventing the plant stem from moving deeper than a predetermined depth into the stem shaft before the cutting operation.

3. The plant cutter of claim 2, wherein the stop is configured to be adjustable so as to vary the predetermined depth.

4. The plant cutter of claim 2, further comprising a mechanical means for holding the plant stem in the stem shaft.

5. The plant cutter of claim 1, further comprising a signal device to indicate that the plant stem has reached a predetermined depth within the stem shaft before the cutting operation begins.

6. The plant cutter of claim 1, wherein the cutting device is a sharp physical object which is moved through a cutting path at the desired angle.

7. The plant cutter of claim 6, wherein the sharp physical object is comprised of a blade and the cutting path is circular.

8. The plant cutter of claim 1, wherein the cutting device is actuated by a manual motion of a user of the plant cutter.

9. The plant cutter of claim 1, wherein the cutting device is actuated by an electro-mechanical device.

10. The plant cutter of claim 9, wherein the cutting operation is actuated when the stem portion is inserted a predetermined depth into the hole.

\* \* \* \* \*